(12) United States Patent
Allermann et al.

(10) Patent No.: US 7,939,607 B2
(45) Date of Patent: May 10, 2011

(54) PARTIALLY CROSSLINKED ETHYLENE VINYL ACETATE COPOLYMERS WITH LOW MELT INDEX VALUES AND INCREASED TENSILE STRENGTH

(75) Inventors: Gerd A. Allermann, Overijse (BE); Hitesh A. Fruitwala, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 946 days.

(21) Appl. No.: 11/654,731

(22) Filed: Jan. 18, 2007

(65) Prior Publication Data

US 2008/0176994 A1 Jul. 24, 2008

(51) Int. Cl.
*C08F 218/08* (2006.01)
*C08J 3/24* (2006.01)
*C08K 5/14* (2006.01)

(52) U.S. Cl. .................... 525/330.3; 525/386; 525/387; 524/563

(58) Field of Classification Search ............... 525/330.3, 525/386, 387; 524/563
See application file for complete search history.

(56) References Cited

U.S. PATENT DOCUMENTS

| | | | | |
|---|---|---|---|---|
| 4,489,034 A | * | 12/1984 | Davison | 264/331.15 |
| 4,528,155 A | * | 7/1985 | Elder | 264/171.19 |
| 4,675,364 A | | 6/1987 | Churma et al. | |
| 5,106,916 A | * | 4/1992 | Mitchell | 525/255 |
| 5,182,072 A | * | 1/1993 | Tsukada et al. | 264/349 |
| 5,194,516 A | | 3/1993 | Fisher et al. | |
| 5,378,539 A | | 1/1995 | Chen | |
| 5,955,525 A | | 9/1999 | Sanchez et al. | |
| 6,096,816 A | * | 8/2000 | Kuckro | 524/405 |
| 6,313,228 B1 | | 11/2001 | Huber et al. | |
| 6,414,059 B1 | * | 7/2002 | Kobayashi et al. | 524/101 |
| 2004/0249087 A1 | | 12/2004 | Mauk et al. | |

FOREIGN PATENT DOCUMENTS

| | | |
|---|---|---|
| DE | 3732722 A1 | 9/1987 |
| DE | 19502371 | 8/1996 |
| JP | 2003171421 A | 6/2003 |
| JP | 2005187497 A | 7/2005 |
| WO | WO89/05328 | 6/1989 |
| WO | WO91/07761 | 5/1991 |

* cited by examiner

*Primary Examiner* — Roberto Rabago (57) ABSTRACT

Ethylene vinyl acetate compositions that have been partially crosslinked using organic peroxides are disclosed, as well as methods for their production. The crosslinked compositions have low melt index values and increased tensile strength, leading to flexibility and heat resistant properties.

37 Claims, 2 Drawing Sheets

Figure 1

PARTIALLY CROSSLINKED ETHYLENE VINYL ACETATE COPOLYMERS WITH LOW MELT INDEX VALUES AND INCREASED TENSILE STRENGTH

FIELD OF THE INVENTION

The present invention relates to partially cross-linked ethylene-vinyl acetate (EVA) copolymers and methods for producing the same. The copolymers of the invention are cross-linked with one or more organic peroxides in an amount and under conditions sufficient to substantially lower the melt index of the starting EVA composition while maintaining or increasing the tensile strength of the copolymer.

BACKGROUND

Cross-linked compositions, including copolymers of ethylene and vinyl acetate (EVA), are well-known in the art and have a wide variety of end uses. In particular, cross-linked EVA is especially suited for applications requiring superior thermal and mechanical performance, such as in wire and cable insulation material. EVA may be crosslinked using, for example, silanes, peroxides, and/or electron beam radiation. It is known in the art to partially crosslink an EVA copolymer using an organic peroxide. In such cases, crosslinking is typically initiated in an extrusion step and/or during a subsequent compounding step, in which additional components such as other polymers, fillers and/or additives are blended with the EVA copolymer (usually by a customer, rather than the producer, of the copolymer). Crosslinking may also take place after the EVA copolymer has been formed into a final product, such as, for example, by extrusion onto a wire or cable as a coating material and then heating to initiate crosslinking. In such situations, the composition is may be partially crosslinked prior to forming or extruding, and full crosslinking is then initiated on the wire or cable.

U.S. Pat. No. 5,182,072 discloses a process wherein an EVA copolymer and an organopolysiloxane are mixed at a temperature of at least 160° C. for a sufficient length of time to provide a melt index of from 0.05 to 8 g/10 min. Addition of an organic peroxide in an amount from about 0.001 to about 1 parts by weight is optional.

U.S. Pat. No. 5,194,516 discloses a process for increasing the viscosity of copolymers of either (a) ethylene and $C_1$-$C_8$ acrylates, or (b) ethylene, vinyl esters of $C_1$-$C_4$ carboxylic acids, and another comonomer, by treating the copolymer with a free radical-generating agent. Such treatment is said to reduce the melt index of the copolymer to 0.1-15 g/10 min while producing a copolymer product having a gel content of less than 3%.

U.S. Pat. No. 5,378,539 discloses a flame-retardant thermoplastic composition comprising a blend of ethylene copolymers, polyethylene, metal hydroxides, and optionally a coupling agent and a compatabilizing agent. The composition is mildly crosslinked with peroxide and a polyfunctional compound during blending.

U.S. Pat. No. 5,955,525 discloses an insulating formulation that is a mixture of vulcanizable halogen free polyolefins with low smoke emission and fire resistance characteristics formulated with a hydrated inorganic charge, an alkoxysilane, a curing agent, an additive such as a process assistance agent, and a combination of two antioxidants. The formulation is said to be suitable for use in compounds to insulate and cover cables and electric conductors.

WO 91/07761 discloses a cable coating composition comprising an ethylene-derived polymer having a melt index from 0.1 to 10 g/10 min, a filler, a crosslinking agent, and a stabilizer. The composition is extruded onto a conductor core prior to crosslinking and then crosslinked by activating the crosslinking agent.

WO 89/05328 discloses a process for producing an intermediate product for subsequent conversion to objects made of ethylene vinyl acetate. A peroxide is added to the product as a crosslinking agent.

JP 2005187497 A, JP 2003171421 A, and DE 3732722 A1 may also provide relevant background information in the field of crosslinked EVA copolymers.

A method has not been previously described for forming a crosslinked EVA copolymer that increases the molecular weight of the copolymer and maintains or increases the tensile strength while significantly lowering the melt index of the resulting partially crosslinked polymer. Such a method and the partially crosslinked copolymer that result from such a method are beneficial because the tensile strength and heat resistant properties of the copolymer are improved, while maintaining the flexibility and burning performance that exist due to the presence of vinyl acetate in the copolymer.

SUMMARY OF THE INVENTION

The present invention is directed to preparing partially crosslinked EVA copolymers in a manner such that the resulting copolymer has increased tensile strength and molecular weight but a significantly lower melt index. The invention also encompasses partially crosslinked EVA copolymers, including those produced by the methods described herein. These cross-linked copolymers are formed by blending a copolymer comprising ethylene- and vinyl acetate-derived units with an organic peroxide at a temperature sufficient to induce cross-linking while reducing the melt index value of the resulting copolymer composition to less than about one-tenth of the melt index value of the starting uncrosslinked EVA copolymer. As a result, partially cross-linked compositions are formed having improved thermal and mechanical properties, including improved tensile strength and hot knife performance. In particular, relatively high levels of vinyl acetate-derived units in the compositions help to improve filler loading, flame retardance, and flexibility, while the low melt index values of the compositions result in increased tensile strength. Further, increased viscosity as a result of cross-linking of the compositions described herein creates shear and thus increases homogeneity if and when the compositions are compounded with other ingredients.

These compositions may be subsequently compounded and are suited for use in a variety of applications, especially in wire and cable applications requiring materials having superior mechanical and electrical properties as well as heat and flame resistance. The EVA compositions described herein may additionally be grafted using a grafting initiator such as a silane compound or maleic anhydride to further improve bonding with flame retardant fillers in a final compounded application.

In one embodiment, the present invention provides a method for producing an at-least partially cross-linked EVA polymer composition. The method comprises blending organic peroxide in an amount of from about 0.03 to about 1.0 wt % with an ethylene vinyl acetate copolymer containing from about 2 to about 80 wt % vinyl acetate-derived units at a temperature sufficient to initiate cross-linking. The melt index (MI) value of the resulting partially cross-linked composition (in g/10 min measured at 190° C. and 2.16 kg mass) is less than or equal to 10% of the MI value of the uncrosslinked EVA copolymer, and the tensile strength of the resulting composition is at least as great as that of the uncrosslinked EVA copolymer. Further, the EVA copolymer is preferably partially crosslinked in a separate manufacturing step prior to any possible subsequent compounding steps.

In a further embodiment, the present invention comprises an at least partially cross-linked polymer composition comprising the reaction product of an EVA copolymer containing from about 2 to about 80 wt % vinyl acetate-derived units and from about 0.03 to about 1.0 wt % of an organic peroxide. When compounded with other ingredients, particularly for use in wire and cable applications, the compounded composition further has a hot knife measurement at 80° C. less than or equal to 50%. In one embodiment, the hot knife measurement at 90° C. is less than or equal to 50%.

In another embodiment, the present invention encompasses an at least partially cross-linked polymer composition comprising the reaction product of an EVA copolymer containing from about 2 to about 80 wt % vinyl acetate-derived units and from about 0.03 to about 1.0 wt % of an organic peroxide. The MI value of the resulting partially crosslinked composition (in g/10 min measured at 190° C. and 2.16 kg mass) is less than or equal to 10% of the MI value of the starting uncrosslinked EVA copolymer, and the tensile strength of the resulting partially crosslinked composition is at least as great as that of the uncrosslinked EVA copolymer. In a particular aspect of this embodiment, the partially crosslinked composition is used to form a heat-resistant sheathing material useful in wire and cable applications.

In further embodiments, the partially crosslinked polymer compositions described herein may be further grafted by the addition of a grafting agent. In some embodiments, the grafting agent is maleic anhydride.

DETAILED DESCRIPTION OF THE INVENTION

Methods for Producing at Least Partially Crosslinked Compositions

In some embodiments, the present invention provides methods for producing at least partially crosslinked EVA polymer compositions. In one embodiment, the method comprises blending from about 0.03 to about 1.0 weight percent of an organic peroxide with an EVA copolymer containing from about 2 to about 80 weight percent units derived from vinyl acetate. In some embodiments, the vinyl acetate content of the EVA copolymer is from about 2 to about 45 weight percent, and is preferably from about 20 to about 40 weight percent.

The organic peroxide may be one or more organic peroxides that will effectively at least partially crosslink the EVA copolymer. Exemplary organic peroxides include diacyl peroxides, such as for example decanoyl peroxide, lauroyl peroxide, succinic acid peroxide, and benzoyl peroxide; dialkyl peroxides, such as for example dicumyl peroxide, 2,5-di(t-butylperoxy)-2,5-dimethylhexane, t-butyl cumyl peroxide, α,α-bis(t-butylperoxy)diisopropylbenzene, di(t-amyl)peroxide, di(t-butyl)peroxide, and 2,5-di(t-butylperoxy)-2,5-dimethyl-3-hexyne; diperoxyketals, such as for example 1,1-di(t-butylperoxy)-3,3,5-trimethylcyclohexane, 1,1-di(t-butylperoxy)cyclohexane, 1,1-di(t-amylperoxy)-cyclohexane, n-butyl-4,4-di(t-amylperoxy)valerate, ethyl-3,3-di(t-amylperoxy)butanoate, t-butyl-peroxy-2-ethylhexanoate, and ethyl-3,3-di(t-butylperoxy)butyrate; hydroperoxides, such as for example cumene hydroperoxide and t-butyl hydroperoxide; ketone peroxides, such as for example methyl ethyl ketone peroxide and 2,4-pentanedione peroxide; peroxydicarbonates, such as for example di(n-propyl)peroxydicarbonate, di(sec-butyl)peroxydicarbonate, and di(2-ethylhexyl)peroxydicarbonate; and peroxyesters, such as for example 3-hydroxy-1,1-dimethylbutyl peroxyneodecanoate, α-cumyl peroxyneodecanoate, t-amyl peroxyneodecanoate, t-butyl peroxyneodecanoate, t-amyl peroxypivalate, t-butyl peroxypivalate, 2,5-di(2-ethylhexanoylperoxy)-2,5-dimethylhexane, t-amyl peroxy-2-ethylhexanoate, t-butyl peroxy-2-ethylhexanoate, t-amyl peroxyacetate, t-butyl peroxyacetate, t-butyl peroxybenzoate, OO-(t-amyl)-O-(2-ethylhexyl)monoperoxycarbonate, OO-(t-butyl)-O-isopropyl monoperoxycarbonate, OO-(t-butyl)-O-(2-ethylhexyl) monoperoxycarbonate, polyether poly-t-butylperoxy carbonate, and t-butyl peroxy-3,5,5-trimethylhexanoate. The foregoing list is not intended to be exhaustive, and any organic peroxide that will facilitate crosslinking of the EVA copolymer to produce the desired results is within the spirit and scope of the invention. In certain embodiments, the preferred organic peroxide is 2,5-di(t-butylperoxy)-2,5-dimethyl-3-hexyne or 2,5-di(t-butylperoxy)-2,5-dimethylhexane. The organic peroxide is preferably added in an amount of from about 0.03 to about 1.0 weight percent, or from about 0.05 to about 0.5 weight percent based on the total weight of the blend. More preferably, the organic peroxide is added in an amount of from about 0.05 to about 0.25 weight percent, and most preferably in an amount of from about 0.1 to about 0.2 weight percent.

The EVA copolymer and the peroxide are mixed at a temperature sufficient to initiate crosslinking. Persons of skill in the art will appreciate that a wide variety of temperatures and temperature profiles may be effective for initiating crosslinking, and that such temperatures will vary based on a number of parameters, such as, for example, the type of vessel used for the crosslinking process and the particular peroxide used. Such temperature manipulations are well within the abilities of one having skill in the art, and are therefore not set forth in detail herein.

The EVA copolymer and the organic peroxide are blended using any suitable process such as, for example, a batch or continuous mixing process. These processes are well known in the art and include single and twin screw mixing extruders, static mixers, internal mixers, including Banbury-type mixers, and impingement mixers, as well as any other machine or process designed to disperse a first component and a second component in intimate contact. In preferred embodiments of the invention, the mixing process is conducted in an extruder, even more preferably in a twin-screw extruder.

As previously stated with regard to temperature, the mixing process conditions are highly variable, as will be appreciated by one of skill in the art. The residence time (i.e., in an extruder or other continuous process), mixing speed, feed rate, and pressure, for example, may be adjusted as needed and such adjustments are well within the knowledge of one of ordinary skill in the art. As long as the objectives of the invention are met, including, for example, reaching specified melt index and tensile strength values, the processing conditions are not critical. However, for the purposes of illustration only, typical process conditions when using a twin screw extruder include residence times of about 10 seconds to about 10 minutes, preferably from about 30 seconds to about 5 minutes, and more preferably from about 30 seconds to about 2 minutes, and the temperature in various zones within the extruder may range from about 50° C. to about 275° C., preferably from about 75° C. to about 250° C., and more preferably from about 125° C. to about 225° C.

In some embodiments of the present invention, the peroxide may be diluted in oil, water, or another organic solvent or any other suitable diluent and injected into an extruder or mixer. A preferred oil is mineral oil, used to dilute the peroxide to a solution comprising from about 5 to about 50 weight percent peroxide, preferably from about 5 to about 20 weight percent peroxide. In one embodiment, a mineral oil solution comprising about 10 percent by weight of 2,5-di(t-butylperoxy)-2,5-dimethyl-3-hexyne has been found to be effective. In other embodiments of the present invention, the peroxide may be added directly to the mixing vessel in pure form as a liquid, powder, paste, or other solid.

Alternatively, the peroxide may be added to the mixing vessel as part of a masterbatch. The term "masterbatch" is used herein in accordance with the generally accepted meaning of the term as understood by one of ordinary skill in the art. In the absence of an understanding of the term "masterbatch," it is meant to encompass any previously prepared mixture, typically in solid or powder form, of a base material (or carrier) and one or more additives that is meant to allow for uniform dispersion of very small amounts of said additives in a product during a manufacturing process.

In further embodiments of the present invention, the peroxide may be contacted with the EVA copolymer by soaking pellets of the copolymer in a diluted peroxide solution. In this manner, the copolymer pellets are loaded into the extruder or mixing vessel and heated to a temperature sufficient to induce crosslinking without having to inject or otherwise add peroxide to the vessel during the mixing process.

As previously described, the EVA copolymer and organic peroxide are blended at a temperature sufficient to allow crosslinking of the EVA copolymer to occur. The reaction should be permitted to proceed until the degree of crosslinking in the resulting composition is such that the melt index of the crosslinked composition is less than 10% of that of the EVA copolymer starting material while the tensile strength is the same as or greater than that of the EVA copolymer starting material. In preferred embodiments, the melt index of the resulting at least partially crosslinked composition is less than or equal to 5% of the melt index of the starting EVA copolymer, and more preferably is less than or equal to 1% of the melt index of the starting EVA copolymer. Alternatively, in some embodiments of the present invention, the melt index of the resulting partially crosslinked composition is from about 0.01 to about 10.0 g/10 min, measured at 190° C. and 2.16 kg mass, or from about 0.05 to about 5.0 g/10 min. Preferably the melt index of the resulting composition is from about 0.05 to about 2.0 g/10 min, even more preferably the melt index is from about 0.1 to about 1.0 g/10 min, and most preferably the melt index is from about 0.2 to about 0.8 g/10 mm.

Further, it is desired that the resulting partially crosslinked compositions have a tensile strength at least as great as that of the starting uncrosslinked EVA copolymer. Preferably, the resulting composition is crosslinked to a degree such that the tensile strength is at least about 2 MPa greater than the tensile strength of the starting EVA copolymer. More preferably, the resulting tensile strength is at least about 5 MPa greater, and most preferably it is at least about 7.5 MPa greater than that of the starting EVA copolymer. In some alternative embodiments, the partially crosslinked compositions formed by the methods of the invention exhibit at least about a 50% increase in tensile strength when compared to the tensile strength of the starting uncrosslinked EVA. Preferably the increase in tensile strength is at least about 100%, and most preferably the increase is at least about 200%. For the purposes of this disclosure, "tensile strength," unless otherwise stated, is defined as the tensile strength of a polymer sample at maximum elongation, as described in more detail in the test methods referenced below.

The crosslinking methods of the present invention take place prior to subsequent compounding or forming, if any, of the EVA copolymer. The verb "compound," as used herein, is intended to have its ordinary meaning to a person of skill in the art. In the absence of such an understanding, the term "compound" includes at least the act of combining a polymer composition with any necessary additives, fillers, other polymers, and/or other ingredients to obtain a final product composition which can then be molded, extruded, blown, or otherwise formed into a finished product.

Some embodiments of the present invention include the further step of pelletizing the at least partially crosslinked EVA composition as it exits a mixer or extruder. Preferably, the composition is partially crosslinked in an extruder, then pelletized and packaged for sale and/or delivery to a customer, distributor, or other entity for further handling, which may include compounding.

Alternatively, in some embodiments of the present invention, the crosslinking method further includes a subsequent compounding step in which fillers, additives, and/or other polymers are added to the at least partially crosslinked polymer composition previously described. It is believed that the low melt index values of the compositions produced by the methods described herein contribute to improved processability during compounding and various other production operations. In one embodiment, at least one of the ingredients added during the compounding step is a flame retardant filler, preferably inorganic, such as a metal hydroxide. Suitable metal hydroxides include, for example, aluminum and magnesium hydroxide.

Also contemplated in the methods of the present invention is the addition of one or more grafting agents to the blend of the EVA copolymer and the organic peroxide. Such grafting agents improve bonding between fillers and the polymers in a final formulation without compromising flexibility. Grafting agents also serve to improve the compatibility of a polymer with compounding ingredients and/or other polymers. In some embodiments, the grafting agent is, for example, a silane or an acid anhydride, such as maleic anhydride. Persons of ordinary skill in the art, however, will recognize that any grafting agent that is compatible with the EVA copolymer and the organic peroxide is suitable for use in the methods described and is intended to be within the scope of the invention. In one embodiment, maleic anhydride is added to the EVA copolymer and the organic peroxide in an amount of from about 0.05 to about 2.0 weight percent. Preferably, the amount of maleic anhydride added is from about 0.1 to about 1.5 weight percent, and more preferably from about 0.2 to about 1.0 weight percent.

In further embodiments of the invention, crosslinking co-agents may be used in conjunction with the peroxide initiators. These co-agents may also be used when grafting agents, as described previously, are also used in the polymer formulation. Various compounds are known to be useful as crosslinking co-agents. Generally, a compound is useful as a crosslinking co-agent if it has at least two groups containing a reactive carbon-carbon double bond in the molecule. Examples of useful crosslinking co-agents include, but are not limited to, aromatic polyfunctional compounds such as divinylbenzene, diallyl phthalate, diallyl isophthalate, 4-4'-isopropylidenedipehol bis(diethyleneglycolmethacrylate) ether, triallyltrimellitate, and 2,2'-bis(4-acryloxy diethoxyphenyl)propane, aliphatic polyfunctional compounds such as syn-1,2-pulybutadiene, 1,4-butanediol diacrylate, N,N'-methylenebisacrylamide, ethylene glycol dimethacrylate, neopentyl glycol dimethacrylate, trimethylolpropane trimethacrylate, 1,6-hexanediol diacrylate, diethylene glycol dimethacrylate, triethylene glycol dimethacrylate, 1,6-hexanediol dimethacrylate, and tetrahexanediol dimethacrylate, alicylic polyfunctional compounds such as triallyl isocyanurate, trallyl cyanurate, triacrylohexahydro-1,3,5-triazine, and diacryl chlorendate, metal-containing polyfunctional compounds such as aluminum acrylate, aluminum methacrylate, zinc acrylate, zinc methacrylate, magnesium acrylate, magnesium methacrylate, calcium acrylate, calcium methacrylate, zircon acrylate, and zircon methacrylate.

The crosslinking co-agent may be incorporated into the present composition in an amount of from generally about 0 to about 1.0 parts by weight. Preferably, the crosslinking co-agent is present in an amount of from about 0.1 to about 0.6 parts by weight, per 100 parts of the polymeric components. Use of more than 0.6 parts by weight of the crosslinking co-agent may not be desirable for a particular application because the resulting composition may become too highly crosslinked, resulting in an intractable and unprocessable polymer exhibiting lower mechanical characteristics.

In one embodiment of the invention, a method for producing an at least partially crosslinked polymer composition is performed as follows. An EVA copolymer having a vinyl acetate content of from about 20 to about 80 weight percent is loaded into an extruder, and an organic peroxide is also added to the extruder in the form of a pure peroxide, a peroxide solution, a peroxide masterbatch, or a combination of the foregoing. The peroxide is then dispersed in the copolymer by the extruder and the extruder is heated to a temperature sufficient to initiate crosslinking of the EVA copolymer. Once the desired level of crosslinking has been reached, the resulting at least partially crosslinked composition is removed from the extruder. In further embodiments, the composition is cooled and pelletized upon removal from the extruder.

Included in the present invention are any and all at least partially crosslinked polymer compositions produced by the methods described in the preceding paragraphs. Also within the scope of the invention are those compositions that have been both crosslinked and grafted via these methods.

At Least Partially Crosslinked EVA Copolymer Compositions

In some embodiments, the present invention provides at least partially crosslinked polymer compositions comprising the reaction product of an EVA copolymer and an organic peroxide. These crosslinked compositions comprise from about 2 to about 80 weight percent units derived from vinyl acetate, preferably from about 2 to about 45 weight percent units derived from vinyl acetate, and more preferably from about 20 to about 40 weight percent units derived from vinyl acetate.

The melt index of the at least partially crosslinked compositions described herein is generally less than or equal to about 10% of the melt index value of an uncrosslinked EVA copolymer having the same vinyl acetate content. Preferably, the melt index is less than or equal to about 5% of the melt index of the uncrosslinked EVA, and more preferably the melt index is less than or equal to about 1% of the melt index of the uncrosslinked EVA. In some embodiments, the melt index of the partially crosslinked polymer is from about 0.01 to about 10.0 g/10 min, measured at 190° C. and 2.16 kg mass, or from about 0.05 to about 5.0 g/10 min. Preferably the melt index is from about 0.05 to about 2.0 g/10 min, more preferably the melt index is from about 0.1 to about 1.0 g/10 min, and most preferably the melt index is from about 0.2 to about 0.8 g/10 min.

Further, the tensile strength of the partially crosslinked compositions is at least as great as the tensile strength of an uncrosslinked EVA copolymer having the same vinyl acetate content, and is preferably greater than the tensile strength of the uncrosslinked EVA. For example, in some embodiments, the tensile strength of the crosslinked composition is at least about 2 MPa higher than the tensile strength of the uncrosslinked EVA, preferably at least about 5 MPa higher, and more preferably at least about 7.5 MPa higher. Alternatively, the at least partially crosslinked compositions of the invention exhibit at least about a 50% increase in tensile strength when compared to the tensile strength of the uncrosslinked EVA. Preferably the increase in tensile strength is at least about 100%, and most preferably the increase is at least about 200%.

The partially crosslinked polymers of the invention have high molecular weights and maintain the flexibility of the un-crosslinked polymer. For example, the number-average molecular weight (Mn) of the crosslinked copolymers described herein is typically greater than about 10,000, preferably greater than 15,000, and more preferably greater than 20,000. Molecular weight (Mw, Mn, and Mz) were measured by Size Exclusion Chromatography (SEC), as described in further detail in the test methods section below.

The molecular weight distribution, or MWD, of the crosslinked copolymers described herein is typically from about 1.5 to about 5.5, or from about 2.0 to about 5.0, or from about 2.5 to about 4.5. MWD is also measured by SEC, and is equal to the ratio of the weight-average molecular weight (Mw) to the number-average molecular weight (Mn) of a polymer.

Elongation at the breaking point for crosslinked polymer samples as described herein is typically greater than about 600%, preferably greater than about 700%, and most preferably greater than about 750%. Further, 100% modulus values for the polymer compositions of the invention are typically less than about 1.5 MPa, and 300% modulus values are typically less than about 2.5 MPa.

The polymers of the invention may also be grafted in addition to being at least partially cross-linked. In some embodiments, the polymers are grafted via the addition of maleic anhydride in amounts from about 0.05 weight percent to about 2.0 weight percent. In one embodiment, the level of maleic anhydride added is about 0.5 weight percent. The degree of grafting that results is reflected in the tensile strength of the resulting polymer composition. As the polymer becomes more extensively grafted, the tensile strength of the polymer composition increases.

When grafting and cross-linking are done together, particularly when peroxide is used as the cross-linking agent and maleic anhydride is used as the grafting agent, interaction between the grafting and cross-linking agents may occur. In particular, the interaction may require the addition of supplementary amounts of peroxide to achieve the objectives stated herein. These adjustments and increased peroxide levels are fully within the contemplated scope of the invention, and are also well within the abilities of persons having ordinary skill in the relevant art.

The inventive partially crosslinked compositions typically comprise only crosslinked EVA and, possibly, residual material from process oils, crosslinking and/or grafting agents, and/or other remnants from the manufacturing process. It is contemplated, however, that in some circumstances the compositions may be further compounded with additional polymers, fillers, and/or additives. For example, the polymers of the invention may further comprise an effective amount of a flame retardant filler, such as aluminum or magnesium hydroxide. Polymers comprising these flame retardant fillers are especially useful in wire and cable end-use applications, due to their increased heat resistance, good burning performance, and insulative properties. Accordingly, also within the scope of the present invention is a wire or cable in which the sheathing material comprises an at least partially crosslinked EVA polymer composition as described herein or as produced by the methods described herein.

Persons of ordinary skill in the art will recognize that the inventions described may also be useful for a wide variety of other intermediate and end uses, and this description is not intended to be limited to only those applications described herein. For example, further purposes for the methods and compositions disclosed may include use in heat-resistant compounds, semi-conductive compounds, thermoplastic flame retardant compounds, surface protective films, automotive applications, and for asphalt modification. The methods and compounds described herein may also be suitable for applications where complete, rather than partial, crosslinking is desired.

One measure of the heat resistance of a polymer composition is its hot knife performance. During hot knife testing, a knife or other blade-like object is applied to a polymer sample with a constant force, and the polymer sample is heated to a constant temperature for an established length of time. The heat resistance of the polymer is measured by how far the blade has penetrated into the polymer sample at the conclusion of the test. Hot knife testing is generally performed on compounded compositions intended for wire and cable applications, although those having skill in the art will recognize that the hot knife test may be useful in other applications as well. For partially crosslinked polymers described herein which have further been compounded with other ingredients suitable for use in wire and cable applications, the hot knife performance is typically less than 50% deformation when the polymer is heated to 90° C. for 4 hours. Hot knife testing is described in greater detail below.

Test Methods

The polymer properties cited below were determined in accordance with the following test procedures. Where any of these properties is referenced in the appended product claims, it is to be measured in accordance with the specified test procedure.

| Property | Units | Procedure |
|---|---|---|
| Melt Index (MI) | dg/min | ASTM D-1238, condition E (190° C., 2.16 kg mass) |
| Tensile @ Yield | MPa | ASTM D-412 |
| Tensile @ Break | MPa | ASTM D-412 |
| Elongation @ Break | % | ASTM D-412 |
| 100% Modulus | MPa | ASTM D-412 |
| 300% Modulus | MPa | ASTM D-412 |
| Density | g/cm$^3$ | ASTM D-4703 and D1505 |
| Peak Melting Temperature | ° C. | ASTM D-3418 |
| Crystallization Point | ° C. | ASTM D-3418 |

Molecular Weight Measurements

Molecular weight (weight-average molecular weight, Mw, number-average molecular weight, Mn, and z-average molecular weight, Mz) were characterized by size exclusion chromatography (SEC). Specifically, a High Temperature Size Exclusion Chromatograph (Polymer Laboratories 220) was used, equipped with a differential refractive index detector (DRI), an online light scattering detector, and a viscometer. Experimental details, including how the detectors were calibrated, are described in: T. Sun, P. Brant, R. R. Chance, and W. W. Graessley, Macromolecules, Volume 34, Number 19, 6812-6820, (2001).

Three Polymer Laboratories PLgel 10 mm Mixed-B columns were used. The nominal flow rate was 0.5 cm$^3$/min, and the nominal injection volume was 300 μL. The various transfer lines, columns and differential refractometer (the DRI detector) were contained in an oven maintained at 135° C.

Solvent for the SEC experiment was prepared by dissolving 6 grams of butylated hydroxy toluene as an antioxidant in 4 liters of Aldrich reagent grade 1,2,4 trichlorobenzene (TCB). The TCB mixture was then filtered through a 0.7 μm glass pre-filter and subsequently through a 0.1 μm Teflon filter. The TCB was then degassed with an online degasser before entering the SEC.

Polymer solutions were prepared by placing dry polymer in a glass container, adding the desired amount of TCB, then heating the mixture in conventional oven at 160° C. setting point with continuous agitation for about 2 hours. All quantities were measured gravimetrically. The TCB densities used to express the polymer concentration in mass/volume units are 1.463 g/ml at room temperature and 1.324 g/ml at 135° C. The injection concentration ranged from 0.5 to 3.0 mg/ml, with lower concentrations being used for higher molecular weight samples.

The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and (dn/dc) is the same as described below for the LS analysis. Units on parameters throughout this description of the SEC method are such that concentration is expressed in g/cm$^3$, molecular weight is expressed in g/mole, and intrinsic viscosity is expressed in dL/g.

The light scattering detector used was a Wyatt Technology High Temperature mini-DAWN. The polymer molecular weight, M, at each point in the chromatogram is determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{M P(\theta)} + 2 A_c c$$

Here, $\Delta R(\theta)$ is the measured excess Rayleigh scattering intensity at scattering angle θ, c is the polymer concentration determined from the DRI analysis, $A_2$ is the second virial coefficient, P(θ) is the form factor for a monodisperse random coil (described in the above reference), and $K_o$ is the optical constant for the system:

$$K_o = \frac{4\pi^2 n^2 \left(\frac{dn}{dc}\right)^2}{\lambda^4 N_A}$$

in which $N_A$ is Avogadro's number, and (dn/dc) is the refractive index increment for the system. The refractive index, n=1.500 for TCB at 135° C. and λ=690 nm. In addition, $A_2$=0.0006 for propylene polymers and 0.0015 for ethylene polymers, and (dn/dc)=0.104 for both of propylene polymers and ethylene polymers.

A high temperature Viscotek Corporation viscometer was used, which has four capillaries arranged in a Wheatstone bridge configuration with two pressure transducers. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, [η], at each point in the chromatogram is calculated from the following equation:

$$\eta_s = c[\eta] + 0.3(c[\eta])^2$$

where c was determined from the DRI output.

The branching index (g') is calculated using the output of the SEC-DRI-LS-VIS method as follows. The average intrinsic viscosity, $[\eta]_{avg}$, of the sample is calculated by:

$$[\eta]_{avg} = \frac{\Sigma c_i [\eta]_i}{\Sigma c_i}$$

where the summations are over the chromatographic slices, i, between the integration limits. The branching index g' is defined as:

$$g' = \frac{[\eta]_{avg}}{kM_v^\alpha}$$

where k=0.0002288 and α=0.705 for propylene polymers, and k=0.000579 and α=0.695 for ethylene polymers. $M_v$ is the viscosity-average molecular weight based on molecular weights determined by LS analysis.

Hot Knife Testing

Hot knife performance of the crosslinked polymers described herein was determined according to the following method. The procedure described herein was performed using samples intended for use as sheathing material for electrical cables and/or cords, but persons of skill in the art will recognize that the procedure may be modified accordingly to test the hot knife performance of any sample of polymer material. An illustration of the test apparatus, including the blade, stirrups, and weight, is presented in FIG. 1. The reference numbers used in this section correspond with those shown in FIG. 1.

Figure 1:
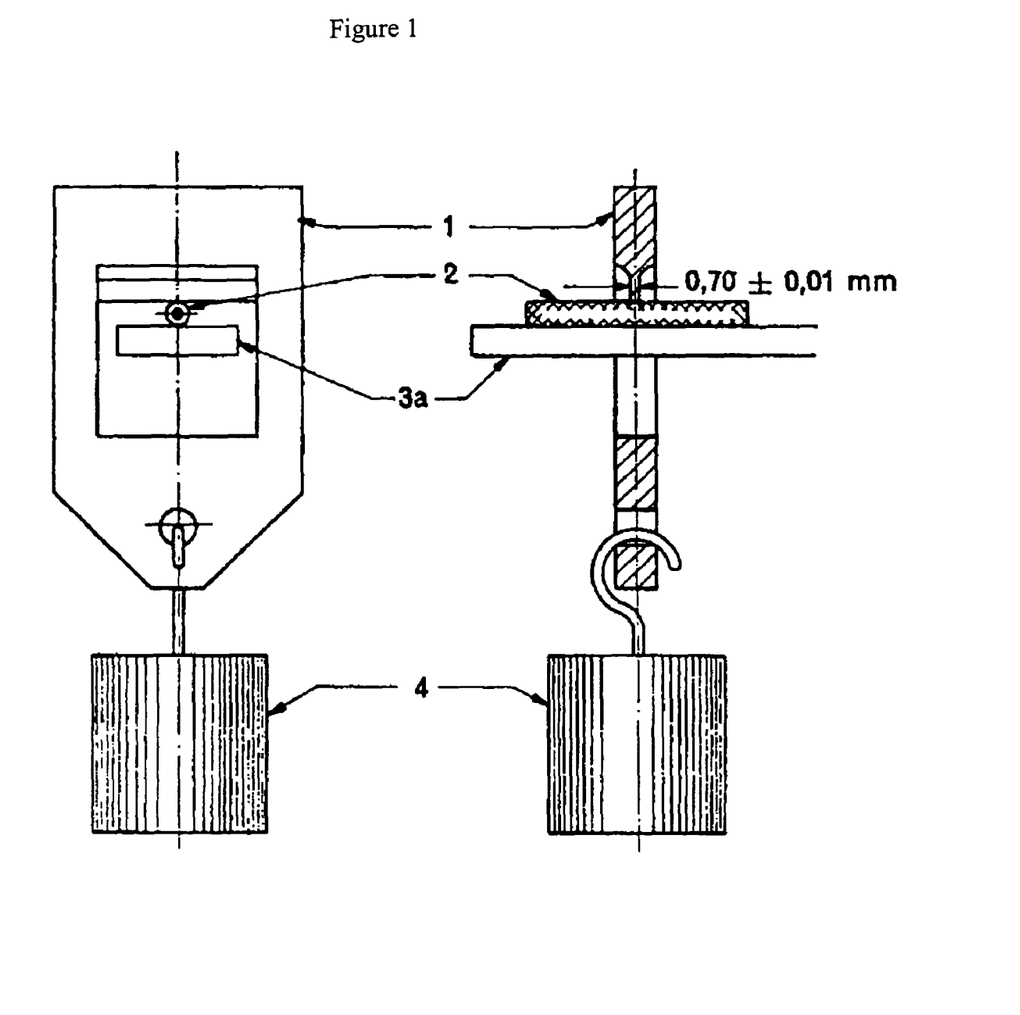
FIG. 1 illustrates the configuration of the test apparatus used in the hot knife test procedure described below.

Three adjacent segments, each between 50 and 100 mm in length, were taken from a cable sample from which the covering, if any, and all of the internal parts such as cores, filler, etc. were removed. The sample was cut in the direction of the axis of the cable. If ridges were present in the sheathing material, the samples were cut so that each segment had, at most, one groove lying approximately in the middle of the strip.

Each strip was then supported by a metal pin or tube having a radius approximately equal to half the inner diameter of the test piece. The strip and supporting pin (2) were then placed on a flat support (3a), and a rectangular blade (1) having an edge 0.7.+−.0.01 mm wide was applied to the outer surface of the test piece in a direction perpendicular to the axis of the pin. The blade was fixed in stirrups carrying one or more modular weights (4), which can be lowered mechanically so as to apply the blade to the test piece in a controlled manner. The force to be exerted on the test piece by the blade is given by the following equation:

$$F = k * \sqrt{(2Dt - t^2)}$$

where F is the compression force in N, k is a coefficient specified in the relevant cable standard, D is the thickness of the outer diameter of the test piece (in mm rounded to the first decimal), and t is the thickness of the insulation or sheathing in mm (rounded to the first decimal). If not specified, k is:

0.6 for flexible cords and cores of flexible cords 0.6 for cores, cables, and fixed installations with a diameter less than 15 mm 0.7 for cores, cables, and fixed installations with a diameter greater than 15 mm 0.8 for cores, cables, and fixed installations with a diameter greater than 10 mm in accordance to the German specification DIN VDE 0281 for EVA insulation.

Once the test apparatus was loaded with the sample, the loaded apparatus was placed in an air oven and held in the oven for the time and temperature specified in the relevant cable standard. Where not specified, samples should be held for the following lengths of time:

4 hours for cores and cables having a rated voltage not exceeding 1.8/3 kV and a conductor cross-sectional area not exceeding 35 $mm^2$ 6 hours for cores and cables having a rated voltage exceeding 1.8/3 kV and a conductor cross-sectional area exceeding 35 $mm^2$ For tests on pressed plates, the test time and temperature should be in accordance with the test conditions for the cable for which the material is intended to be used For the results described herein, samples were heated for 4 hours in a 90° C. oven.

At the end of the testing time, the test samples were chilled by spraying them with cold water while the samples were still under the load of the testing apparatus. The samples were cooled in this manner until they reached a temperature where recovery of the material no longer occurred, and were then further cooled by immersion in cold water.

Once cool, the test pieces were removed from the testing apparatus and the depth of the indentation made by the blade was measured using a measuring microscope. Measurements were made in mm to two decimal places. The result is expressed as percent deformation, calculated as follows:

$$\% \text{ deformation} = \frac{(t_1 - t_2)}{t_1} * 100$$

where $t_1$ is the original thickness of the test sample as measured on a flat area of the strip 1 cm away from the indentation and $t_2$ is the thickness after indentation.

Generally, the polymer compositions of the present invention show acceptable hot knife performance at testing temperatures up to at least about 90° C. For wire and cable applications, acceptable hot knife performance is generally considered to be a percent deformation of less than or equal to about 50%. Persons of ordinary skill in the art will recognize that for other applications, and even for some wire and cable applications, a percent deformation of greater than 50% will be acceptable. Specifically, the polymers of the present invention exhibit hot knife performance of less than or equal to 90% deformation at 90° C., preferably less than or equal to 50% or 40% deformation at 90° C.

EXAMPLES

Certain features and advantages of embodiments of the invention are illustrated by the following non-limiting examples.

For all of the following tests, an uncrosslinked EVA copolymer having a vinyl acetate content of approximately 39%, a melt index of approximately 60 g/10 min (measured at 190° C. and 2.16 kg mass), a tensile strength of about 3.2 MPa, and an elongation maximum of about 900% was used. In particular, the EVA copolymer used was Escorene™ Ultra EVA UL 05540EH2, which can be obtained from ExxonMobil Chemical Co. Physical properties of the EVA copolymer used are shown in Table 1.

TABLE 1

| | |
|---|---|
| Melt Index* | 60 g/10 min |
| VA content | 39 wt % |
| Density | 0.966 g/cm$^3$ |
| Peak Melt Temperature | 47° C. |
| Crystallization Point | 28° C. |

*Correlated from melt flow rate values measured at 125° C.

Examples 1-9

An EVA copolymer (Escorene™ Ultra EVA UL 05540EH2) having a vinyl acetate content of approximately 39 wt % was fed to a twin screw extruder at a feed rate of 7 kg/hr and screw speeds of from about 150 to about 200 RPM. Solutions of 10% Luperox 130 pure peroxide (2,5-di(t-butylperoy)-2,5-dimethyl-3-hexyne, available from Arkema, Inc.) in Marcol 52 mineral oil (available from ExxonMobil, Inc.) were injected into the extruder in amounts ranging from about 0.7 to about 2.8 ml/min, which resulted in peroxide levels in the extruder of from about 0.05 wt % to about 0.2 wt % based on the total weight of the EVA copolymer and the peroxide. In samples 7 and 8, Luperox 101-XL-45 (available from Arkema, Inc.), which contains approximately 45 wt % 2,5-di(t-butylperoxy)-2,5-dimethylhexane, were used instead of the Luperox/Marcol solution. Temperatures in the extruder varied from about 83° C. to about 205° C., and the residence time of the EVA copolymer and peroxide in the reactor was approximately 1 to 1.5 minutes. Specific reaction conditions for samples 1-9 are presented in Table 2.

Properties of the resulting partially cross-linked polymer compositions (samples 1-5) are shown in Table 3.

TABLE 3

| | Example # | | | | |
|---|---|---|---|---|---|
| | 1 | 2 | 3 | 4 | 5 |
| Final MI (g/10 min) | 0.10 | 0.31 | 0.44 | 0.73 | 1.92 |
| Final MI as a % of starting MI | 0.17 | 0.52 | 0.73 | 1.22 | 3.20 |
| Tensile Maximum (MPa) | 10.7 | 9.4 | 8.5 | 7.5 | 6.0 |
| Elongation Maximum (%) | 758 | 768 | 785 | 783 | 818 |
| Modulus at 300% Elongation (MPa) | 2.2 | 1.9 | 1.8 | 1.8 | 1.6 |

Figure 2:
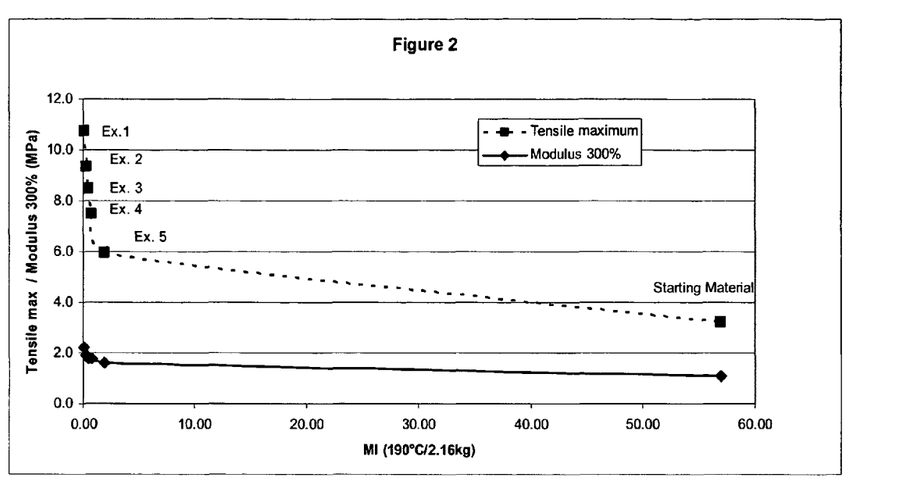
FIG. 2 illustrates the improved properties of tensile maximum and modulus at 300% elongation as a function of decreasing melt index.
Figure 3:
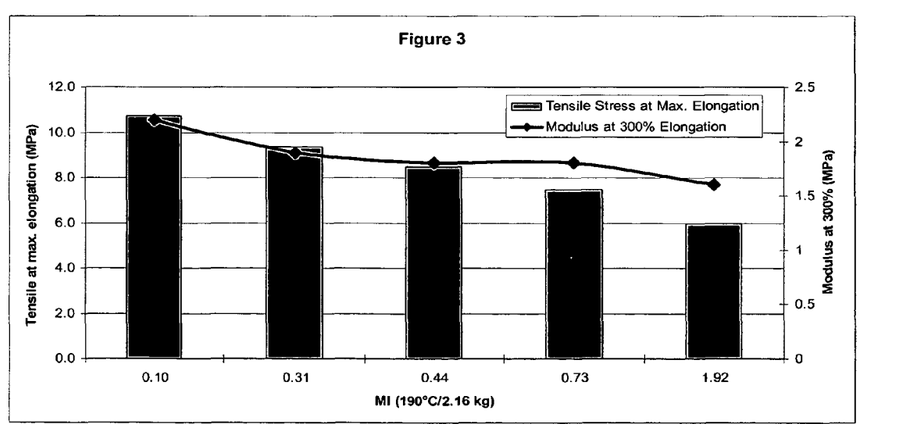
FIG. 3 shows the inventive examples of FIG. 2 on an expanded scale.

As shown in Table 3, the resulting partially crosslinked compositions have melt index values ranging from 0.17% to 3.20% of the melt index value of the starting uncrosslinked EVA copolymer and tensile strength values greater than the tensile strength of the non-crosslinked EVA. Thus, the foregoing method effectively produces partially crosslinked compositions having extremely low melt index values and high tensile strength. This relationship is illustrated in FIGS. 2 and 3.

Examples 10-18

Two partially crosslinked EVA polymer compositions were prepared as described above for examples 1 through 9. These compositions are identified as EVA1 and EVA2, having MI values of 1.92 g/10 min and 0.44 g/10 min, respectively. Three samples of each were obtained and these samples were then compounded with the ingredients and in the amounts shown in examples 10 through 15 in Table 4. In addition, three comparative compositions were also produced using Levaprene 500™ in place of the crosslinked EVA, identified as examples 16 through 18 in Table 4. Levaprene 500 is an EVA copolymer available from Lanxess Deutschland GmbH comprising approximately 50 wt % vinyl acetate. The compounding process was as follows. The crosslinked EVA, linear low density polyethylene, filler, and additives were mixed in a Pomoni mixer at a rotor speed of 115 RPM until the melting point of the mixture (approximately 155° C.) was reached. The mixture was then extruded in a Haake extruder with a 2:1

TABLE 2

| | Example # | | | | | | | | |
|---|---|---|---|---|---|---|---|---|---|
| | 1 | 2 | 3 | 4 | 5 | 6 | 7 | 8 | 9 |
| Escorene UL 05540EH2 (wt %) | 99.80 | 99.85 | 99.88 | 99.90 | 99.92 | 99.88 | 99.73 | 99.82 | 99.88 |
| Luperox 130 (wt %) (in Marcol 52) | 0.20 | 0.15 | 0.12 | 0.10 | 0.08 | 0.12 | — | — | 0.12 |
| Luperox 101-XL-45 (wt %) | — | — | — | — | — | — | 0.27 | 0.18 | — |
| Feed Rate EVA (kg/hr) | 7 | 7 | 7 | 7 | 7 | 7 | 7 | 7 | 7 |
| Feed Rate peroxide (ml/min) | 2.788 | 2.091 | 1.673 | 1.394 | 1.115 | 1.673 | — | — | 1.673 |
| Screw Speed (RPM) | 150 | 170 | 170 | 170 | 170 | 170 | 170 | 170 | 200 |
| Temperature - zone 1 (° C.) | 156 | 160 | 159 | 160 | 160 | 163 | 156 | 160 | 83 |
| Temperature - zone 2 (° C.) | 182 | 183 | 182 | 181 | 182 | 184 | 179 | 182 | 183 |
| Temperature - zone 3 (° C.) | 204 | 205 | 203 | 203 | 203 | 205 | 205 | 205 | 204 |
| Temperature - zone 4 (° C.) | 150 | 136 | 139 | 140 | 140 | 171 | 175 | 170 | 170 | screw configuration at a screw speed of 40 RPM. The temperature settings in the extruder were 140° C. in zone 1, 150° C. in zone 2, 160° C. in zone 3, and 155° C. at the head of the die. A flat strip die with a 1 inch width and a 1 mm die gap was used, and the resulting tape was pulled through a waterbath by a reversed calendaring unit. The compositions produced in this manner were then tested using the hot knife procedure described above at 90° C. for 4 hours, using a factor (k) of 0.7. The diameter of the metal mandrel used to support the test pieces was 10 mm. The results are shown in Table 5.

TABLE 4

| | Example # | | | | | | | | |
|---|---|---|---|---|---|---|---|---|---|
| | 10 | 11 | 12 | 13 | 14 | 15 | 16 | 17 | 18 |
| Composition (parts per hundred resin (phr)) | | | | | | | | | |
| EVA 1 (MI = 1.92 g/10 min) | 70 | 70 | 70 | — | — | — | — | — | — |
| EVA 2 (MI = 0.44 g/10 min) | — | — | — | 70 | 70 | 70 | — | — | — |
| Levaprene 500 | — | — | — | — | — | — | 70 | 70 | 70 |
| LLDPE (density 0.92) | 30 | 30 | 30 | 30 | 30 | 30 | 30 | 30 | 30 |
| Martinal OL107EL | 160 | 160 | 160 | 160 | 160 | 160 | 160 | 160 | 160 |
| Chimasorb 944 | 0.3 | 0.3 | 0.3 | 0.3 | 0.3 | 0.3 | 0.3 | 0.3 | 0.3 |
| Chimasorb 81 | 0.2 | 0.2 | 0.2 | 0.2 | 0.2 | 0.2 | 0.2 | 0.2 | 0.2 |
| Irganox 1010 | 0.5 | 0.5 | 0.5 | 0.5 | 0.5 | 0.5 | 0.5 | 0.5 | 0.5 |
| VTEO VS 693 | 1.5 | 1.5 | 1.5 | 1.5 | 1.5 | 1.5 | 1.5 | 1.5 | 1.5 |
| Trigonox B | 0.21 | 0.21 | 0.21 | 0.21 | 0.21 | 0.21 | 0.21 | 0.21 | 0.21 |

TABLE 5

| | Example # | | | | | | | | |
|---|---|---|---|---|---|---|---|---|---|
| | 10 | 11 | 12 | 13 | 14 | 15 | 16 | 17 | 18 |
| Starting thickness (mm) | 1.30 | 1.30 | 1.30 | 1.26 | 1.26 | 1.26 | 1.23 | 1.23 | 1.23 |
| Weight (N) | 3.90 | 3.90 | 3.90 | 3.83 | 3.83 | 3.83 | 3.78 | 3.78 | 3.78 |
| Ending thickness, minimum (mm) | 0.574 | 0.486 | 0.499 | 0.736 | 0.750 | 0.844 | 0.262 | 0.320 | 0.140 |
| Ending thickness, total (mm) | 1.220 | 1.211 | 1.216 | 1.212 | 1.204 | 1.350 | 1.178 | 1.042 | 1.100 |
| Ending thickness, difference (mm) | 0.646 | 0.725 | 0.717 | 0.476 | 0.454 | 0.506 | 0.916 | 0.722 | 0.960 |
| Percent deformation | 53.0 | 59.9 | 59.0 | 39.3 | 37.7 | 37.5 | 77.8 | 69.3 | 87.3 |

Table 5 shows the effect of crosslinking and the corresponding lower melt index values on the heat resistant properties of the EVA copolymers. In particular, the samples comprising EVA2, which has the lowest melt index of the samples tested, have clearly superior heat resistance as measured by the hot knife test.

Examples 19-22

Three partially crosslinked EVA polymer compositions were prepared as described above for examples 1 through 9. These compositions are identified as EVA3, EVA4, and EVA5. EVA4 and EVA5 were then further grafted using 0.5% by weight maleic anhydride. The temperatures in the mixing zone of the extruder were 150° C. and 170° C. for EVA4 and EVA5, respectively. Example 19, listed as a control, comprises the uncrosslinked base resin Escorene™ Ultra EVA UL 05540EH2, whose properties are listed in Table 1. Examples 20-22 correspond to EVA3, EVA4, and EVA5. The resulting melt indices and molecular weight data as measured by SEC (using a light scattering detector) are shown in Table 6.

TABLE 6

| | Example No. | | | |
|---|---|---|---|---|
| | 19 (UL05540EH2) | 20 (EVA3) | 21 (EVA4) | 22 (EVA5) |
| % maleic anhydride | 0 | 0 | 0.5 | 0.5 |
| Melt Index (g/10 min) | 60 | 0.6 | 0.6 | 0.6 |
| Mw | 64150 | 307700 | 108200 | 91650 |

TABLE 6-continued

| | Example No. | | | |
|---|---|---|---|---|
| | 19 (UL05540EH2) | 20 (EVA3) | 21 (EVA4) | 22 (EVA5) |
| Mn | 21000 | 69000 | 39000 | 34700 |
| Mz | 238350 | 1851120 | 487340 | 428525 |
| g' | | 0.62 | 0.37 | 0.50 | 0.53 |
| MWD | 3.05 | 4.46 | 2.77 | 2.64 |

As seen in Table 6, partial peroxide cross-linking of the base resin results in the desired decrease in melt index discussed herein (Ex. 20, 21, and 22). Example 20 reflects polymer which has been crosslinked, but not grafted. As seen in the above table, the MWD of the crosslinked polymer increases, which may detract from the desirable tensile strength and mechanical properties imparted by the lower melt index by decreasing processability of the polymer. In contrast, by further grafting the polymer using maleic anhydride, as seen in examples 21 and 22, the MWD of the polymers decreases to a level similar to that of the base resin (ex.

19), thus helping to maintain processability while gaining the benefits of the decreased melt index.

Although the present invention has been described in considerable detail with reference to certain aspects and embodiments thereof, other aspects and embodiments are possible. For example, while ethylene vinyl acetate copolymers have been exemplified, other copolymers are also contemplated. Therefore, the spirit and scope of the appended claims should not be limited to the description of the versions contained herein.

Certain features of the present invention are described in terms of a set of numerical upper limits and a set of numerical lower limits. It should be appreciated that ranges from any lower limit to any upper limit are within the scope of the invention unless otherwise indicated. A list of embodiments according to the invention includes, but is not limited to, the following:

Embodiment 1. A method for producing an at least partially cross-linked polymer composition, having a melt index (MI) value and tensile strength, comprising blending from about 0.03 to about 1.0 weight percent of an organic peroxide with an ethylene vinyl acetate (EVA) copolymer, having a MI value and tensile strength, containing from about 2 to about 80 weight percent units derived from vinyl acetate at a temperature sufficient to initiate cross-linking, wherein:
  the MI value of the at least partially cross-linked polymer composition in g/min (190° C., 2.16 kg) is less than or equal to 10% of the MI value of the EVA copolymer, and
  the tensile strength of the at least partially cross-linked polymer composition is at least as great as the tensile strength of the EVA copolymer.

Embodiment 2. The method of Embodiment 1, wherein the peroxide is blended with the copolymer in a continuous mixing process.

Embodiment 3. The method of Embodiment 2, wherein the continuous mixing process comprises an extruder.

Embodiment 4. The method of Embodiment 3, wherein the extruder is a twin-screw extruder.

Embodiment 5. The method of Embodiment 3, wherein the extruder is a single-screw extruder.

Embodiment 6. The method of any one of the previous Embodiments, wherein the peroxide is blended with the copolymer in a batch mixing process.

Embodiment 7. The method of Embodiment 6, wherein the batch mixing process comprises an internal mixer.

Embodiment 8. The method of any one of Embodiments 3-7, wherein the residence time in the extruder is from about 30 seconds to about 5 min.

Embodiment 9. The method of Embodiment 8, wherein the residence time in the extruder is from about 30 seconds to about 2 minutes.

Embodiment 10. The method of any one of Embodiments 3-9, wherein the extruder is maintained at a temperature sufficient to initiate peroxide cross-linking.

Embodiment 11. The method of any one of the previous Embodiments, wherein the peroxide is diluted in oil prior to addition to the copolymer.

Embodiment 12. The method of Embodiment 11, wherein the oil mixture comprises about from about 5 to about 50 weight percent peroxide, preferably from about 5 to about 20 weight percent peroxide.

Embodiment 13. The method of any one of Embodiments 3-12, wherein the peroxide is added to the extruder via a masterbatch.

Embodiment 14. The method of any one of the previous Embodiments, wherein the copolymer and peroxide are blended by soaking pellets of the copolymer in a pure or diluted peroxide solution.

Embodiment 15. The method of any one of the previous Embodiments, wherein the melt index of the at least partially cross-linked polymer composition is from about 0.05 to about 2.0 g/10 min., preferably from about 0.1 to about 1.0 g/10 min., more preferably from about 0.2 to about 0.8 g/10 min.

Embodiment 16. The method of any one of the previous Embodiments, wherein the EVA copolymer comprises from about 2 to about 45 weight percent units derived from vinyl acetate, preferably from about 20 to about 40 weight percent units derived from vinyl acetate.

Embodiment 17. The method of any one of the previous Embodiments, wherein the organic peroxide is added in an amount from about 0.05 to about 0.25 weight percent based on the total weight of the blend, preferably from about 0.1 to about 0.2 weight percent.

Embodiment 18. The method of any one of the previous Embodiments, wherein the tensile strength of the at least partially cross-linked polymer composition is at least 2 mPa greater, preferably at least 5 mPa greater, more preferably at least 7.5 mPa greater than the tensile strength of the EVA copolymer.

Embodiment 19. The method of any one of the previous Embodiments, further comprising the step of adding an inorganic flame retardant filler to the at least partially cross-linked composition in a subsequent compounding step.

Embodiment 20. The method of any one of the previous Embodiments, wherein the melt index value of the at least partially cross-linked polymer composition is less than or equal to 5%, preferably less than or equal to 1%, of the starting MI value of the EVA copolymer.

Embodiment 21. The method of any one of the previous Embodiments, further comprising the step of pelletizing the at least partially cross-linked polymer composition.

Embodiment 22. The method of any one of Embodiments 1-21, further comprising the addition of a grafting agent.

Embodiment 23. The method of Embodiment 22, wherein the grafting agent is maleic anhydride in an amount of from about 0.05 to about 2.0 weight percent, preferably from about 0.1 to about 1.5 weight percent, more preferably from about 0.2 to about 1.0 weight percent.

Embodiment 24. The method of any one of the previous Embodiments, wherein the at least partially cross-linked polymer composition has not been compounded with any other polymers, fillers, or additives.

Embodiment 25. An at least partially cross-linked polymer composition produced by the method of any one of the previous Embodiments.

Embodiment 26. An at least partially cross-linked polymer composition comprising the reaction product of an ethylene vinyl acetate (EVA) copolymer containing from about 2 to about 80 weight percent units derived from vinyl acetate and from about 0.03 to about 1.0 weight percent of an organic peroxide, wherein the melt index (MI) value of the at least partially cross-linked polymer composition in g/10 min (190° C., 2.16 kg) is less than or equal to 10% of the MI value of the EVA copolymer and the tensile strength of the at least partially cross-linked polymer composition is at least as great as the tensile strength of the EVA copolymer.

Embodiment 26. The composition of Embodiment 26, wherein the hot knife performance of the cross-linked composition is less than 50% penetration at 90° C.

Embodiment 28. The composition of Embodiment 27, wherein the MI of the at least partially cross-linked composition is from about 0.05 to about 2.0 g/10 min., preferably from about 0.1 to about 1.0 g/10 min., more preferably from about 0.2 to about 0.8 g/10 min.

Embodiment 29. The composition of any one of Embodiments 26-28, wherein the EVA copolymer comprises from about 2 to about 45 weight percent, preferably from about 20 to about 40 weight percent units derived from vinyl acetate.

Embodiment 30. The composition of any one of Embodiments 26-29, wherein the MI value of the at least partially cross-linked composition is less than or equal to 5%, preferably less than or equal to 1% of the MI value of the EVA copolymer.

Embodiment 31. The composition of any one of Embodiments 26-30, wherein the tensile strength of the at least partially cross-linked composition is at least 2 mPa greater, preferably at least 5 mPa greater, more preferably at least 7.5 mPa greater, than the tensile strength of the EVA copolymer.

Embodiment 32. The composition of any one of Embodiments 26-31, further comprising an effective amount of an inorganic flame retardant filler.

Embodiment 33. The composition of any one of Embodiments 26-31, wherein the composition has not been compounded with any other polymers, fillers, or additives.

Embodiment 34. The composition of Embodiment 32 or 33, wherein the polymer composition is at least partially crosslinked and grafted.

Embodiment 35. A wire or cable in which the sheathing material comprises an at least partially cross-linked composition made by the method of any one of Embodiments 1-24.

Embodiment 36. A wire or cable in which the sheathing material comprises an at least partially cross-linked composition according to any one of Embodiments 25-34.

All patents, test procedures, and other documents cited in this application are fully incorporated by reference for all jurisdictions in which such incorporation is permitted.

What is claimed is:

1. A method for producing an at least partially cross-linked ethylene vinyl acetate (EVA) copolymer, having a melt index (MI) value and a tensile strength, comprising blending from about 0.03 to about 0.25 weight percent of an organic peroxide with an EVA copolymer, having a MI value and a tensile strength, containing from about 2 to about 80 weight percent units derived from vinyl acetate at a temperature sufficient to initiate cross-linking, wherein:
   a. the MI value of the at least partially cross-linked EVA copolymer in g/10 min (190° C., 2.16 kg) is less than or equal to 10% of the MI value of the EVA copolymer prior to cross-linking, and
   b. the tensile strength of the at least partially cross-linked EVA copolymer is at least 5 MPa greater than the tensile strength of the EVA copolymer prior to cross-linking.

2. The method of claim 1, wherein the at least partially cross-linked EVA copolymer has not been compounded with any other polymers, fillers, or additives.

3. The method of claim 1, wherein the peroxide is blended with the copolymer in a continuous mixing process.

4. The method of claim 3, wherein the continuous mixing process comprises an extruder.

5. The method of claim 4, wherein the extruder is a twin-screw extruder.

6. The method of claim 4, wherein the extruder is a single-screw extruder.

7. The method of claim 1, wherein the peroxide is blended with the copolymer in a batch mixing process.

8. The method of claim 7, wherein the batch mixing process comprises an internal mixer.

9. The method of claim 4, wherein the residence time in the extruder is from about 30 seconds to about 5 min.

10. The method of claim 9, wherein the residence time in the extruder is from about 30 seconds to about 2 minutes.

11. The method of claim 4, wherein the extruder is maintained at a temperature sufficient to initiate peroxide cross-linking.

12. The method of claim 1, wherein the peroxide is diluted in oil prior to addition to the copolymer.

13. The method of claim 12, wherein the diluted peroxide is injected into an extruder or mixer.

14. The method of claim 13, wherein the extruder is a twin screw extruder.

15. The method of claim 13, wherein the extruder is a single screw extruder.

16. The method of claim 12, wherein the oil mixture comprises about from about 5 to about 50 weight percent peroxide.

17. The method of claim 16, wherein the oil mixture comprises from about 5 to about 20 weight percent peroxide.

18. The method of claim 4, wherein the peroxide is added to the extruder via a masterbatch.

19. The method of claim 1, wherein the copolymer and peroxide are blended by soaking pellets of the copolymer in a pure or diluted peroxide solution.

20. The method of claim 1, wherein the melt index of the at least partially cross-linked EVA copolymer is from about 0.05 to about 2.0 g/10 min.

21. The method of claim 1, wherein the melt index of the at least partially cross-linked EVA copolymer is from about 0.1 to about 1.0 g/10 min.

22. The method of claim 1, wherein the melt index of the at least partially cross-linked EVA copolymer is from about 0.2 to about 0.8 g/10 min.

23. The method of claim 1, wherein the EVA copolymer comprises from about 2 to about 45 weight percent units derived from vinyl acetate.

24. The method of claim 23, wherein the EVA copolymer comprises from about 20 to about 40 weight percent units derived from vinyl acetate.

25. The method of claim 1, wherein the organic peroxide is added in an amount from about 0.05 to about 0.25 weight percent based on the total weight of the EVA copolymer.

26. The method of claim 25, wherein the organic peroxide is added in an amount from about 0.1 to about 0.2 weight percent.

27. The method of claim 1, wherein the tensile strength of the at least partially cross-linked EVA copolymer is at least 7.5 MPa greater than the tensile strength of the EVA copolymer prior to cross-linking.

28. The method of claim 1, further comprising the step of adding an inorganic flame retardant filler to the at least partially cross-linked EVA copolymer in a subsequent compounding step.

29. The method of claim 1, wherein the melt index value of the at least partially cross-linked EVA copolymer is less than or equal to 5% of the starting MI value of the EVA copolymer prior to cross-linking.

30. The method of claim 29, wherein the melt index value of the at least partially cross-linked EVA copolymer is less than or equal to 1% of the starting MI value of the EVA copolymer prior to cross-linking.

31. The method of claim 1, further comprising the step of pelletizing the at least partially cross-linked EVA copolymer.

32. The method of claim 1, further comprising the addition of a grafting agent.

33. The method of claim 32, wherein the grafting agent is maleic anhydride in an amount of from about 0.05 to about 2.0 weight percent based on the total weight of the EVA copolymer.

34. The method of claim 33, wherein the amount of maleic anhydride is from about 0.1 to about 1.5 weight percent.

35. The method of claim 34, wherein the amount of maleic anhydride is from about 0.2 to about 1.0 weight percent.

36. A method for producing at least partially cross-linked EVA copolymers comprising:
   a. loading an EVA copolymer having a vinyl acetate content of from about 20 to about 80 weight percent into an extruder;
   b. adding an organic peroxide, organic peroxide solution, organic peroxide masterbatch, or a combination of the foregoing into the extruder, such that the amount of organic peroxide is from about 0.03 to about 0.25 weight percent of the EVA copolymer;
   c. dispersing the peroxide in the copolymer;
   d. heating the extruder to a temperature suitable to initiate cross-linking of the copolymer; and
   e. removing from the extruder the resulting at least partially cross-linked EVA copolymer which has a tensile strength at least 5 MPa greater than the tensile strength of the starting EVA copolymer.

37. The method of claim 36 further comprising the step of pelletizing the resulting cross-linked EVA copolymer.

* * * * *